United States Patent [19]
Ong

[11] Patent Number: 5,195,117
[45] Date of Patent: Mar. 16, 1993

[54] METHOD FOR USING SECONDARY RADIATION SCATTERING TO EVALUATE THE THICKNESS OF MATERIALS

[75] Inventor: Poen S. Ong, Houston, Tex.

[73] Assignee: University of Houston, Houston, Tex.

[21] Appl. No.: 874,274

[22] Filed: Apr. 24, 1992

[51] Int. Cl.$^5$ .......................................... G01N 23/201
[52] U.S. Cl. ........................................ 378/89; 378/86; 378/70
[58] Field of Search ................... 378/89, 90, 70, 62, 378/63, 64, 86

[56] References Cited

U.S. PATENT DOCUMENTS

| 22,531 | 8/1944 | Hare ....................................... 378/99 |
| 3,846,631 | 11/1974 | Kehler ................................. 250/269 |
| 4,525,845 | 6/1985 | Molbert et al. ....................... 378/89 |

FOREIGN PATENT DOCUMENTS 3-181840  8/1991  Japan ..................................... 378/89

OTHER PUBLICATIONS

Lott et al., "Near Real-time Radiologic Corrosion Monitoring of Arctic Petroleum Gathering Lines" *Materials Evaluation*, Mar. 1985.

Harding et al., "X-ray Imaging with Compton-scatter Radiation," *Phillips Tech. Rev.* 41 (1983): 46–59.

*Primary Examiner*—Constantine Hannaher
*Assistant Examiner*—Don Wong
*Attorney, Agent, or Firm*—Fulbright & Jaworski

[57]  ABSTRACT

A method for using secondary radiation scattering to evaluate the thickness of materials. The thickness of a first material adjacent to a second material may be evaluated by bombarding the first material with radiation and measuring the radiation scattered by the second material behind it. The method is particularly useful in evaluating the thickness of hydrocarbon-carrying pipelines.

3 Claims, 6 Drawing Sheets

METHOD FOR USING SECONDARY RADIATION SCATTERING TO EVALUATE THE THICKNESS OF MATERIALS

BACKGROUND OF THE INVENTION

X-rays and gamma rays have long been used to determine qualities such as the mass density and the thickness of materials. In particular applications, these radiation have been used to examine hydrocarbon-carrying pipelines to inspect them for wear and corrosion. In spite of the applied protective coating, pipelines are nevertheless subjected to corrosion at the surface. Because of the highly corrosive nature of crude oil, crude-carrying pipelines are also subjected to erosion at the inner surface. For safety reasons, periodic inspection of pipelines for mechanical and physical integrity is mandatory. Desirable inspection procedure includes the detection of the presence and the amount of moisture and rust at the surface, and material losses on the inner wall. Pipelines are generally covered with a thick (4 inch) insulator for the purpose of heat retention or protection against corrosive components in the atmosphere. Removal of the insulator is expensive and, if asbestos is incorporated in the insulator, hazardous. Inspection should therefore be carried out with the insulator in place, without compromising speed, cost, and reliability.

Many X-ray techniques have been proposed or are in use for the purpose of measuring the wall thickness of pipelines. These techniques can be divided into two broad categories: "transmission" and "backscatter" techniques.

The "transmission technique" is similar to the method used by a medical X-ray machine. In the transmission technique, an object, such as pipeline, is bombarded with radiation. The radiation that is transmitted through the object is received on a film or similar detector. The radiation transmitted reveals information about the object. For example, a photograph qualitatively depicting pitting within a pipe can be generated using the transmission technique.

The transmission technique is unsatisfactory for most pipeline inspection needs for several reasons. First, pipeline often runs in bundles, so that it is not possible to detect transmitted radiation on a particular stand of pipe. Second, the transmission technique is inaccurate because both sides of the pipe are unavoidably measured at the same time resulting in a sum. Third, the measurement requires high radiation density and high tube voltage and the method detects only localized qualitative deviations, such as pitting, within the area of the applied incident radiation beam. In practice, the transmission image is recorded on film and assessments are subjectively made by trained technicians. Thus, the transmission technique is essentially useless in quantitatively determining precise wear absent expensive, in-depth image analysis.

The "backscatter" technique uses a scanning detector or detector array to form a line image in the depth dimension of the steel pipe as it is penetrated by a fine X-ray beam. The scatter intensity is proportional to the local electron density of the sample and to the X-ray intensity at a specific point. Ideally, the resulting image is a density profile of the sample along the incident beam and can reveal the presence of moisture, steel, and corrosion. From the density transitions, with rust on one side and the hydrocarbon products on the other side, the thickness of the uncorroded steel may be found. Thickness determination based on density changes works well with low-absorbing material like plastics and aluminum where the envelope of the image does not decay too rapidly with depth. In steel pipes, serious practical problems arise because the steel/crude boundary becomes blurred and cannot be distinguished from the rapidly decaying intensity. This blurring is due to the point spread function of the system and the rapid decay function of the steel.

To sharpen the blurred backscatter image caused by rapidly decaying scatter intensity, the area of the incident radiation beam as well as the detector collimator width need to be reduced, both resulting in a reduction in intensity. In fact, to be useful for pipeline applications, the diameter of the incident radiation beam must be much smaller than the thickness of the steel pipe. For example, if losses of 10% in wall thickness are to be detected, the incident radiation beam must be at least 10% of that dimension. An increase in voltage of the X-ray source may be used to improve the total intensity and reduce the absorption in steel, but such an approach is impractical. First, sources of sufficiency high voltage are not readily available commercially. Second, the increase in background noise and equipment weight make using such a radiation source impractical. Third, such a radiation source would increase the danger of radiation exposure to those in the vicinity of the source. Those skilled in the art have directed their efforts at developing imaging techniques to reduce blurring caused by the point spread function.

SUMMARY OF THE INVENTION

It is an object of the present invention to measure the thickness of a sample material from one side.

It is a further object of the present invention to accurately measure the thickness of a sample material using low photon energy radiation.

To achieve the foregoing objects, there is disclosed a method of evaluating the thickness of a first material having first and second sides, the second side adjacent to a second material of suitably low photoelectric absorption comprising the steps of bombarding the first side of the first material with a primary radiation selected from the group consisting of X-rays and gamma rays, wherein the primary radiation is both scattered and absorbed by the first and second materials; measuring the intensity of the radiation incident to the first side of the first material; detecting the intensity of the radiation scattered from the second material; and measuring the thickness of the first material by comparing the incident radiation to the radiation scattered from the second material.

DETAILED DESCRIPTION OF THE DRAWINGS AND PREFERRED EMBODIMENTS

Figure 1:
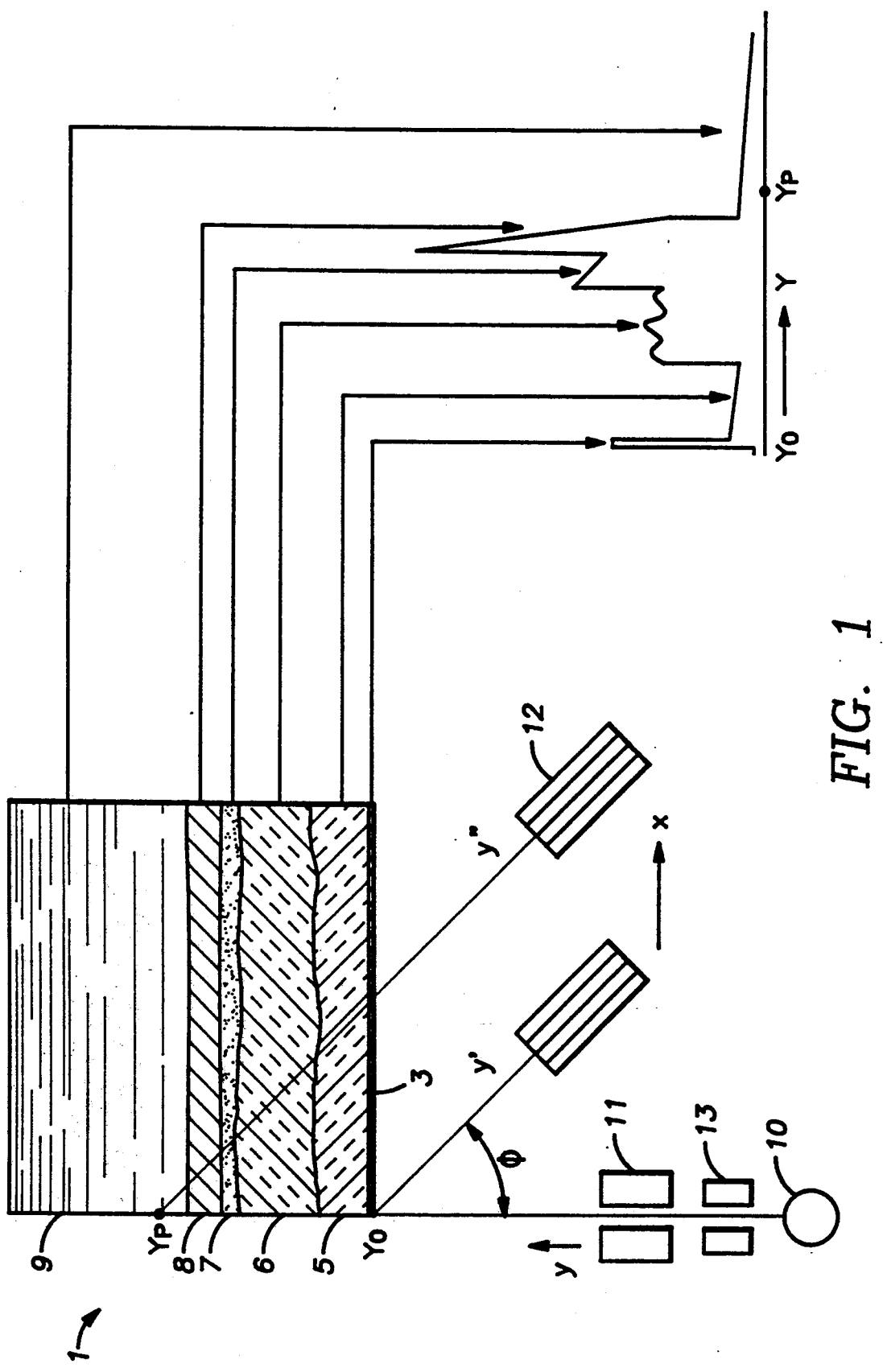
FIG. 1 is a schematic of a typical embodiment of the claimed invention.

Referring now to the drawings, particularly FIG. 1, a typical hydrocarbon-carrying pipeline is bombarded with a beam of X-ray or gamma radiation y. The pipe has a metal jacket 3, dry insulator 5, wet insulator 6, rust 7, steel pipe 8, and hydrocarbon 9. The beam of radiation y emanates from radiation source 10 and is defined by collimator 11. Collimated detector 12 receives and ascertains the intensity of the scattered radiation y', which scatters from point Yo, and y'', which scatters from point Yp. As detector 12 moves along the pipe away from radiation beam y', it selectively receives radiation scattered from discrete points along the continuum between points Yo and Yp. Detector 13 detects the intensity of the radiation y.

The points between Yo and Yp can be plotted against scattered radiation intensity to produce the computer-generated, qualitative graph comprising the right portion of FIG. 1. As seen from the graph, the metal jacket 3 scatters radiation to produce a squared peak. The dry insulator 5 scatters little radiation. The wet insulator 6 unevenly absorbs and scatters radiation. Both the rust 7 and the steel pipe 8 strongly scatter and absorb the radiation. Radiation unabsorbed and unscattered by the pipeline 1 is weakly scattered and absorbed by the hydrocarbon 9, because of its low photoelectric absorption producing a substantially constant intensity of scattered radiation which decreases only slightly along the continuum between the steel pipe 8 and point Yp.

Figure 3:
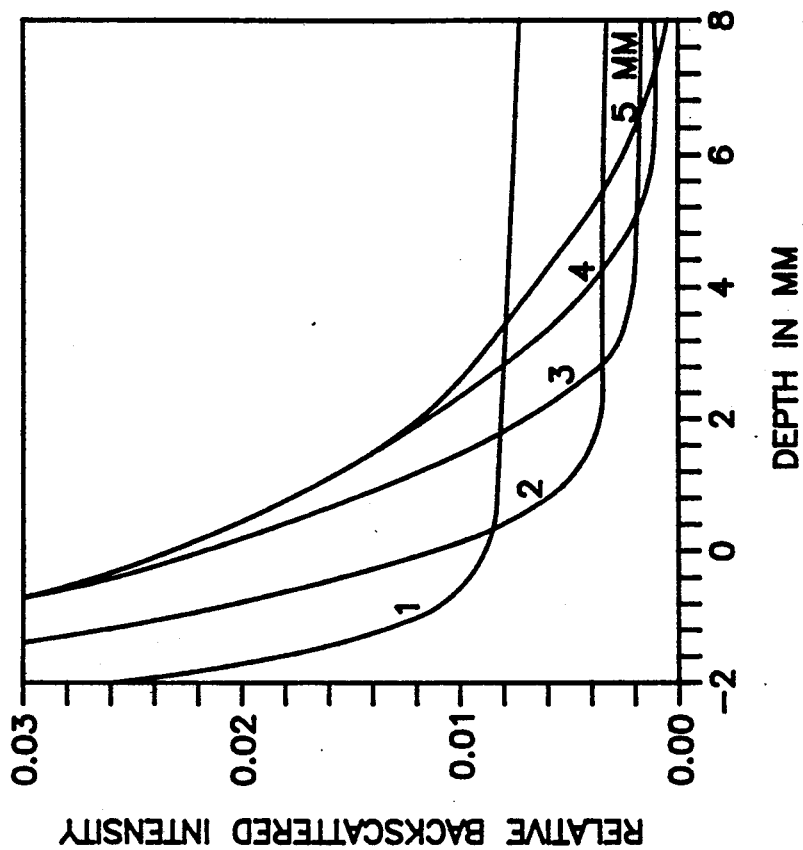
FIG. 3 is an enlarged view of FIG. 2 focusing on the point of transition between scattering from the pipes and scattering from the hydrocarbons.
Figure 2:
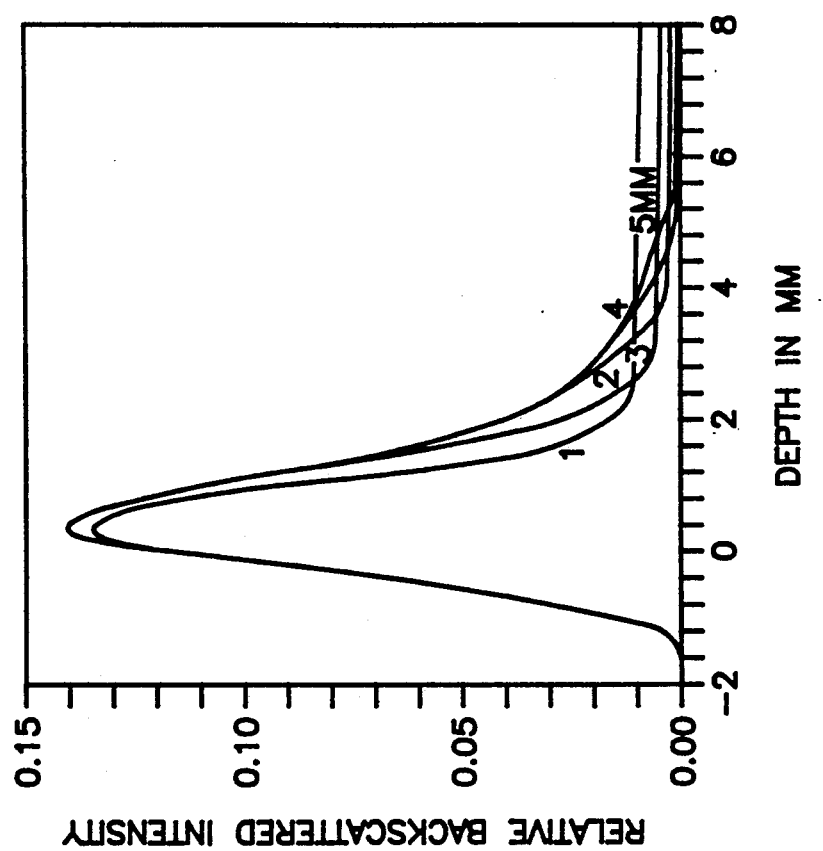
FIG. 2 is a computer-generated response of scattered radiation intensity from five pipe thicknesses.

FIG. 2 is a computer-generated qualitative graph of a distance in millimeters along the continuum between points Yo and Yp for five thicknesses of steel pipe 8. The distances are limited to those just in front of and behind the steel pipe 8. FIG. 3 is an enlarged view of FIG. 2, focusing on the radiation scattered by the hydrocarbon 9. As seen in FIGS. 1-3, there are for the steel pipe 8 two transition points defined the scattered radiation. The first point, called the "first transition," is the left portion of the tallest peak of FIG. 1. It has a high slope and, therefore, clearly defines the location of the exterior of the steel pipe 8. The backscatter technique of the prior art readily determines the location of the exterior of the steel pipe 8 by ascertaining the first transition.

The second point, known as the "second transition," is, unlike the first transition, blurred at the boundary between the interior of the steel pipe 8 and the hydrocarbon 9. Because of the blurring along the second transition, the backscatter method cannot satisfactorily determine the location of the interior of the steel pipe 8. However, as depicted in FIGS. 2-3, the scattering from the hydrocarbon is relatively constant along its depth dimension because of its low photoelectric absorption.

To accurately determine the quantitative thickness of a steel pipe in accordance with the instant invention, the thickness of the steel at the point of entry of the primary beam must be determined, as well as the thickness of the steel at the point of exit of the scattered radiation. Thus, there are two variables, requiring two measurements to solve two equations. An example of how such measurements may be taken is depicted in FIG. 4.

Figure 4B:
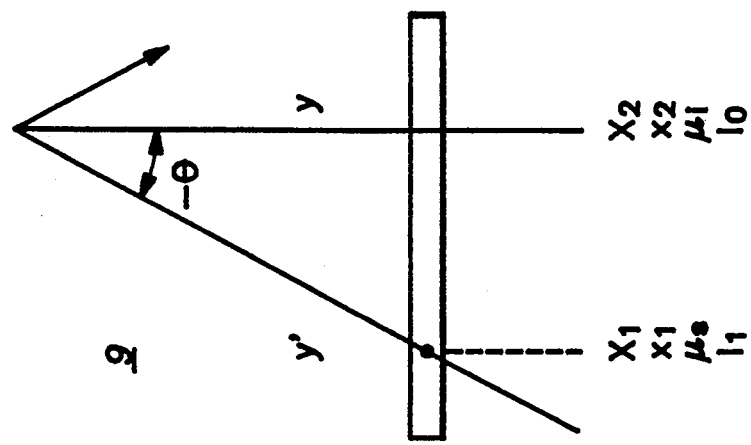
FIGS. 4a and b are a schematic of the claimed invention using measurements in sequences of two.
Figure 4A:
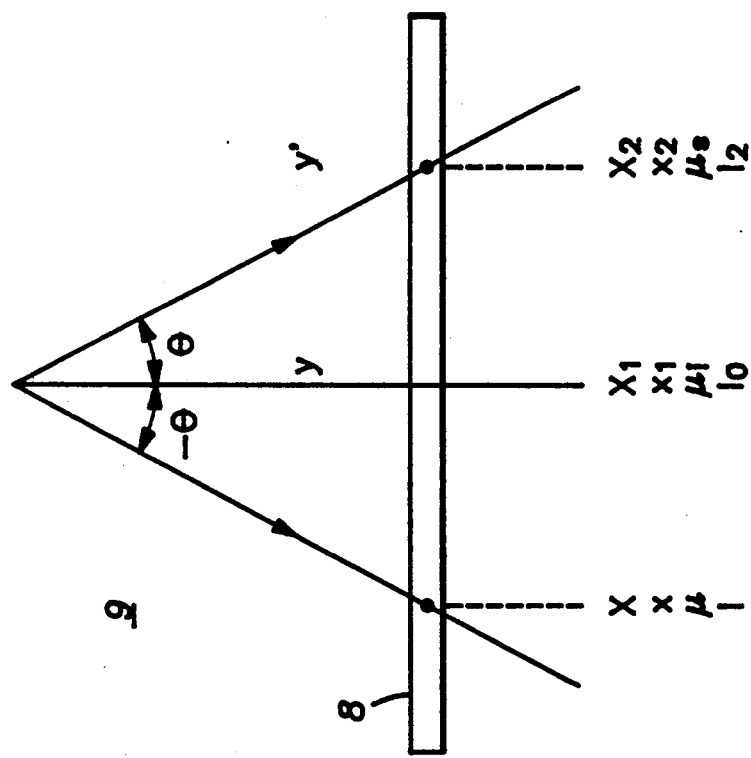

As depicted in FIG. 4a, radiation beam y is incident at location $X_1$ of the steel pipe 8. The scattered radiation y' exits at location $X_2$ of the steel pipe 8. The thickness of the steel pipe 8 is $x_1$ at point $X_1$, and $x_2$ at point $X_2$. The absorption coefficient $\mu$ of the steel pipe 8 differs at points $X_1$ and $X_2$ because of Compton losses; the absorption coefficient at $X_1$ is represented by $\mu_i$, and at $X_2$ by $\mu_s$. The coefficient $\mu$ is readily determined experimentally or by reference by one skilled in the art. $I_o$ is the intensity of y at the external surface of steel pipe 8, and $I_2$ is the intensity of y' after exiting the steel pipe 8.

As depicted in FIG. 4(b), a second measurement may be taken by moving the primary beam y to point $X_2$. For the second measurement, $I_1$ is the intensity of y' after exiting the steel pipe 8.

In a pipeline or other sample material covered by insulation or other covering material the intensity $I_0$ can be found by using a scanning backscatter detector as taught by the prior art to obtain a density profile in the depth dimension, as illustrated in FIG. 1. In FIG. 1, the composition of the material of the various components located between the jacket and the steel surface is generally known, and their thicknesses can be determined with reasonable accuracy from the density profile. Also, the angular position of the scanning detector can be used to locate the depth position of the steel surface with respect to the radiation source. For example, if in FIG. 1 the distance between y and detector 12 is "a" and the angle between the detector direction and y is $\phi$, then the depth dimension "d"=a cotan $\phi$. The scatter intensity obtained from the depth profile can now be related to the intensities at any point in the sample either by the use of a calibration curve obtained with a test setup simulating the insulation and rust, or computed by solving the equation $I_o = I_x \exp-(\mu_j x_j + \mu_{in} x_{in} + \mu_r x_r)$, where $I_o$ is the intensity at the steel surface and $I_x$ the intensity emitted by the radiation source. The subscripts j, in, and r refer to respectively the jacket, insulators, and rust; the various values of $\mu$ are known constants, and the various thickness values x are derived form the density profile. The intensity $I_x$ is obtained by temporarily inserting a detector 13 in the beam path in front of the jacket.

$I_1$ and $I_2$ are readily obtained by detecting the radiation exiting points $X_1$ and $X_2$ along path y'. Because the scattering from the hydrocarbon 9 is relatively constant, the width of y' may be much wider than permissible with the backscatter method, which focuses on the unreliable second transition. In fact, the width of y' is limited only by the need to avoid scattering from the opposite side of the pipe 8, the size of the pipe area the tester wishes to examine, and the fact that there is some (although limited) deterioration in the scatter intensity along the depth dimension of the hydrocarbon 9. As the width of y' increases, the intensity required of the radiation source decreases. In any particular application of the claimed invention, one skilled in the art will mathematically balance the foregoing factors in view of desired accuracy of $I_1$ and $I_2$ to determine the appropriate photon energy of the radiation source and detector collimator size.

From the foregoing, the thicknesses $x_1$ and $x_2$ can be determined as follows:

$$\ln I_1 = \ln(\alpha I_0) - \mu_i x_2 - \mu_s x_1 \sec \Theta.$$

$$\ln I_2 = \ln(\beta I_0) - \mu_\rho x_1 - \mu_s x_2 \sec \Theta.$$

where the constant $\alpha$ is the intensity fraction that accounts for attenuation from scattering and absorption in the hydrocarbon along the path of y. The constant $\alpha$ must be experimentally determined to calibrate the method for the specific hydrocarbon in the pipe analyzed and the path length of y.

Figure 5:
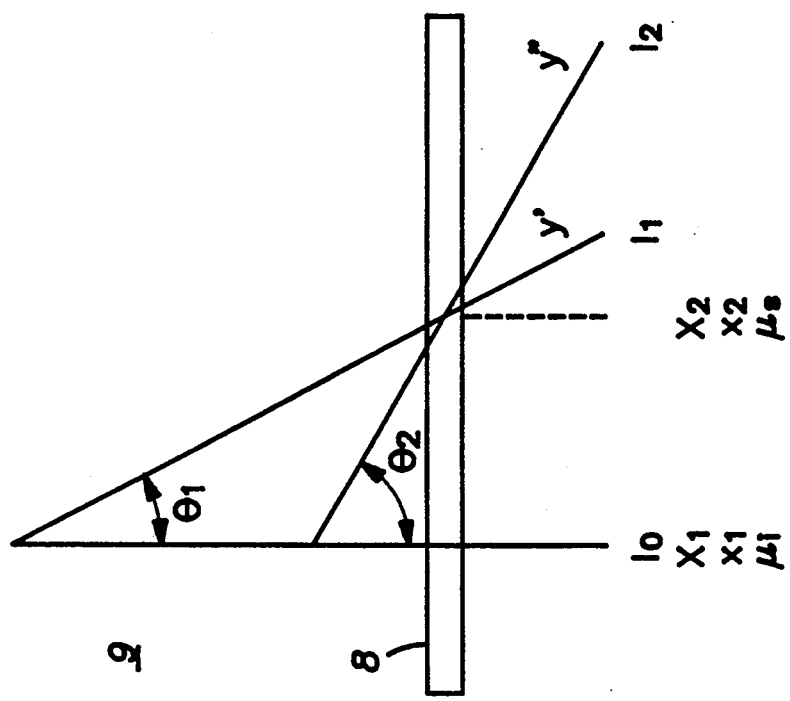
FIG. 5 is a schematic of the claimed invention using dual scattering angles.

The thickness measurements $x_1$ and $x_2$ can also be obtained without shifting the position of the primary beam y, but by detecting radiation scattered from the hydrocarbon from different angles at the same radiation exit point in the steel pipe 8. FIG. 5 depicts such an arrangement. From the geometry of FIG. 5, $x_1$ and $x_2$ can be determined as follows:

$$\ln I_1 = \ln(\alpha I_0) - \mu_\rho x_1 - \mu_s x_2 \sec \Theta_1.$$

$$\ln I_2 = \ln(\beta I_0) - \mu_\rho x_1 - \mu_s x_2 \sec \Theta_2.$$

In the foregoing two equations, the constant $\alpha$ is the intensity fraction that accounts for attenuation along the path of y'. The constant $\beta$ is the intensity fraction that accounts for attenuation along the path of y''.

If only relative thicknesses are to be evaluated, the instant invention can be employed using one equation and one measurement, and by selecting a reference thickness $x_r$ as follows:

$$\ln I_2 = \ln(\alpha I_0) - \mu_\rho x_r - \mu_s x_2 \sec \theta, \text{ or}$$
$$x_2 = \frac{\ln I_2 + \ln(\alpha I_0) - \mu_\rho x_r}{\mu_s \sec \theta}$$

To evidence the accuracy of the instant invention, experiments were conducted with steel plates of various known thicknesses adjacent to a layer of paraffin. The pipes were bombarded at a first point $X_1$ with incident of radiation of 160 KV along a path y. The diameter of the incident radiation beam was 2.5 mm. A single scintillation detector was mounted on an arm such that it rotated about a single second point $X_2$ on the pipe. The detector was collimated to obtain maximum intensity along a path y' through point $X_2$ with minimum interference from scattered radiation from the pipe. The angle $\Theta$ formed by y and y' was 25°. The distance between $X_1$ and $X_2$ was 37.5 mm. The detector collimator width was 3.75 mm.

Figure 6:
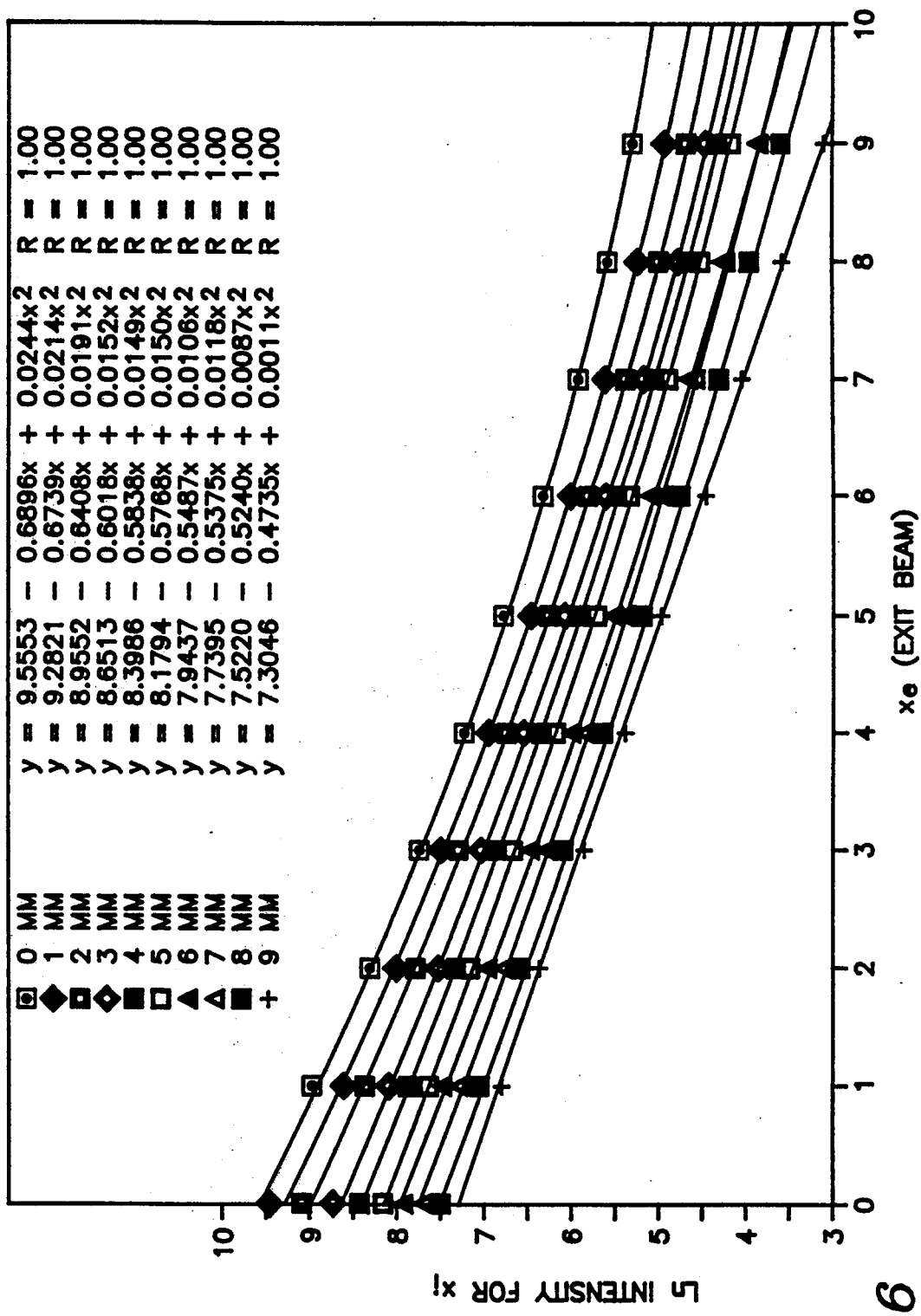
FIG. 6 is an experiment chart of steels of various exit thicknesses using an incident radiation beam of 160 KV.
Figure 7:
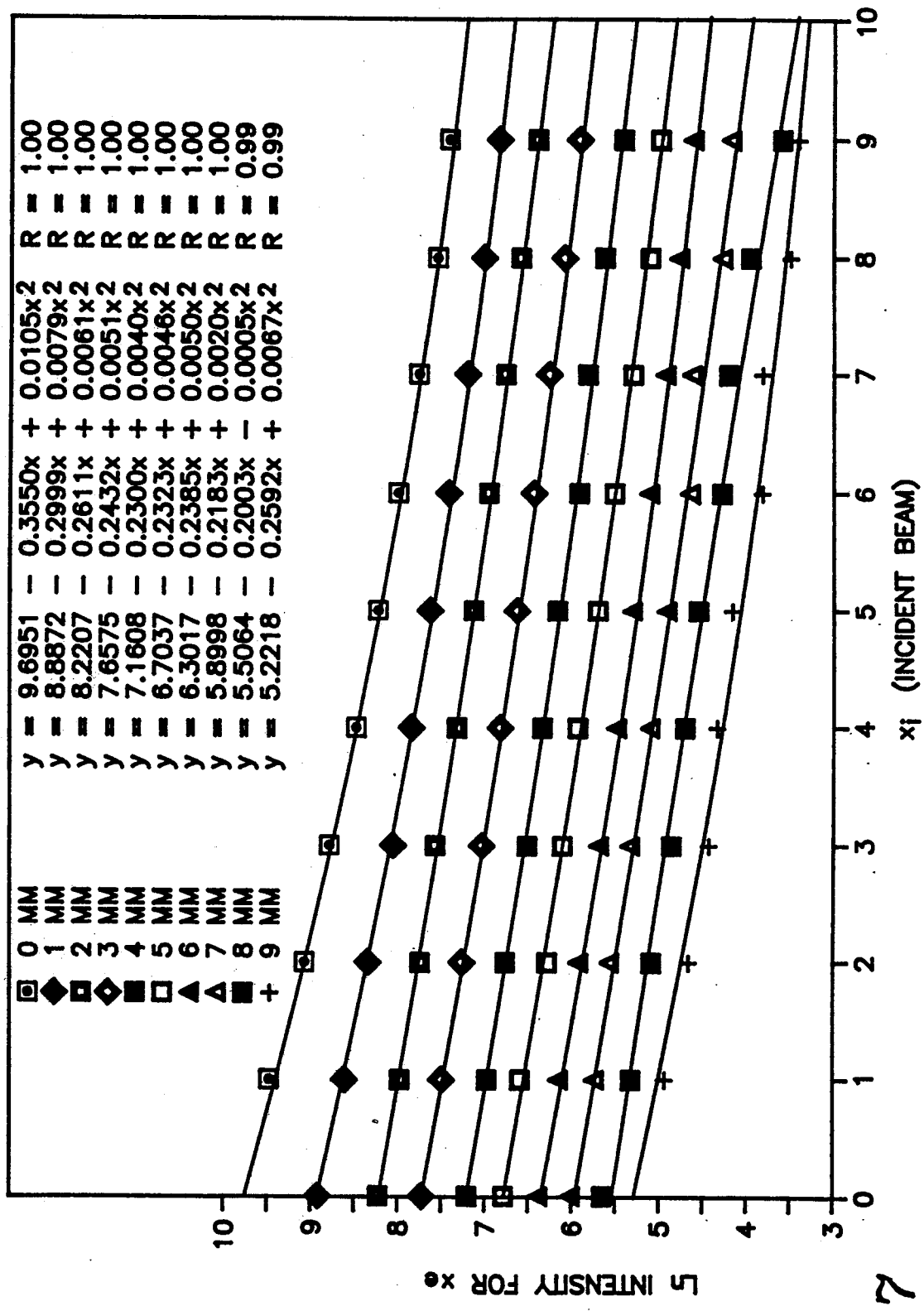
FIG. 7 is an experiment chart of steels of various incident thicknesses using an incident radiation beam of 160 KV.

FIG. 6 shows the natural logarithm of the intensity I existing the pipe at point $X_2$ along path y' versus the known thickness $x_e$ at point $X_2$. As shown in FIG. 6, the experiment was conducted at known thicknesses between 0 and 9 mm at point $X_1$. FIG. 7 shows ln I versus the known thickness $x_i$ at point $X_1$ for known thicknesses between 0 and 9 mm at point $X_2$. The experimental results reveal that the method very accurately determines the thickness of the pipe. In particular, with pipes up to 6 mm thick, the error of the method is within 10%. In contrast, with the same tube voltage of 160 KV, the backscatter technique has an error of about 33% with pipes only 3 mm thick, and that error increases in larger pipes.

As is readily apparent to one skilled in the art, the foregoing principles may be applied to determine the thickness of many materials adjacent to a second material having relative to the first material a suitably low photoelectric absorption. The precise set-up for the apparatus may vary substantially. In particular, the detecting means may vary substantially consistent with the invention. To inspect hydrocarbon carrying pipeline, it is readily apparent to one skilled in the art that the invention may be used to quickly, accurately and inexpensively scan pipelines for defects.

In practicing the invention, no particular characteristics of the first material are required. However, the second layer should have a low photoelectric absorption, such that it produces a substantially constant scattering response along its depth dimension. Photoelectric absorption character is generally a function of atomic number. Suitably low photoelectric absorption character within the scope of the invention may be readily determined by one skilled in the art, depending on accuracy desired and the photon energy of the primary beam. As the photon energy increases, lower photoelectric absorption in the secondary layer is possible.

The invention is preferably used to determine the thickness of steel pipe carry hydrocarbon. In that application, it is preferred that a 160 KV radiation source be used, because such a source is lightweight and relatively safe. The preferred hydrocarbons are paraffin, crude, or other petrochemical products having a density of about 0.9 grams/cc.

I claim:

1. A method of evaluating the thickness of a first material having first and second sides, the second side adjacent to a second material of suitably low photoelectric absorption, comprising the steps of:
    bombarding the first side of the first material with a primary radiation selected from the group consisting of X-rays and gamma rays wherein the primary radiation is both scattered and absorbed by the first and second materials;
    measuring the intensity of the radiation incident to the first side of the first material;
    detecting the intensity of the radiation scattered from the second material; and
    evaluating the thickness of the first material by comparing the incident radiation to the radiation scattered from the second material.

2. The method of claim 1 wherein the first material is a metal pipe and the second material is hydrocarbon.

3. The method of claim 2 wherein the step of detecting the intensity of the radiation incident to the first side of the pipe is accomplished by backscattering.

* * * * *

UNITED STATES PATENT AND TRADEMARK OFFICE
CERTIFICATE OF CORRECTION

PATENT NO. : 5,195,117
DATED : March 16, 1993
INVENTOR(S) : Poen S. Ong

It is certified that error appears in the above-indentified patent and that said Letters Patent is hereby corrected as shown below:

Column 5, line 1, "$\ln I_2 = \ln (\beta I_0) - \mu_i x_1 - \mu_s x_2 \sec \theta$" should be -- $\ln I_2 = \ln (\alpha I_0) - \mu_i x_1 - \mu_s x_2 \sec \theta$ --.

Column 5, lines 31-32, $$"x_2 = \frac{\ln I_2 + \ln (\alpha I_0) - \mu_i x_r}{\mu_s \sec \theta}"$$

should be $$--x_2 = \frac{-\ln I_2 + \ln (\alpha I_0) - \mu_i x_r}{\mu_s \sec \theta}--$$

Signed and Sealed this

First Day of February, 1994

Attest:

BRUCE LEHMAN

*Attesting Officer*   *Commissioner of Patents and Trademarks*